United States Patent [19]

Scanland

[11] 4,422,283
[45] Dec. 27, 1983

[54] LAWNMOWER WITH LONGITUDINAL SUPPORT FRAME

[75] Inventor: Joseph E. Scanland, Savannah, Ga.

[73] Assignee: Roper Corporation, Kankakee, Ill.

[21] Appl. No.: 334,462

[22] Filed: Dec. 28, 1981

[51] Int. Cl.³ ..................... A01D 35/26; A01D 67/00
[52] U.S. Cl. ................................... 56/320.2; 56/17.2; 56/17.5
[58] Field of Search ................... 56/320.2, 320.1, 16.7, 56/17.1, 17.2, 17.4, 256, DIG. 18, 17.5; D15/14

[56] References Cited

U.S. PATENT DOCUMENTS

| | | |
|---|---|---|
| 1,849,953 | 3/1932 | Phalen . |
| 1,868,347 | 7/1932 | Cloud . |
| 2,403,236 | 7/1946 | Phelps ................................ 56/17.4 |
| 2,559,897 | 7/1951 | Phelps . |
| 2,865,159 | 12/1958 | Musgrave . |
| 2,945,338 | 6/1960 | Burrows et al. . |
| 3,118,268 | 1/1964 | Benz .................................. 56/17.2 |
| 3,292,351 | 12/1966 | Larson et al. ....................... 56/17.2 |
| 3,759,023 | 9/1973 | Comer . |
| 4,015,407 | 4/1977 | Bacon ................................. 56/17.2 |
| 4,217,708 | 8/1980 | Prenatt et al. ...................... 56/320.1 |
| 4,307,563 | 12/1981 | Fuelling et al. .................... 56/320.2 |

FOREIGN PATENT DOCUMENTS 2149803 4/1973 Fed. Rep. of Germany ....... 56/17.5

*Primary Examiner*—Robert P. Swiatek
*Assistant Examiner*—John Weiss
*Attorney, Agent, or Firm*—C. Frederick Leydig; Dennis R. Schlemmer; David J. Richter

[57] ABSTRACT

A rotary lawnmower of the type having an inverted pan-shaped housing generally surrounding a horizontal rotary blade affixed to a vertical shaft extending downwardly from a rotary power source mounted on the top of the housing. A pair of tubular longitudinal frame members extend bridgingly in horizontal position over and secured to the housing on opposite sides of the rotary power source with downward extensions secured to front and rear wheels. The downward extensions are also affixed to front and rear aprons extending horizontally from the lower edge of the side wall of the housing to provide mutual bracing. The lawnmower has a handle that is attached to the rear downward extensions of the longitudinal frame members so that forces developed in the handle incident to guiding the mower are transferred directly to the frame members and then directly to the wheels so that the housing is not stressed upon manipulation of the handle. The forces generated in the wheels when striking a bump or hollow are similarly by-passed around the housing. The rigidity gained by the attachment of a longitudinal frame members to the top of the housing and to the forward and rear aprons combined with the direct transfer of force from the handle to the wheel permits the housing to be stamped from lighter weight sheet metal.

11 Claims, 6 Drawing Figures

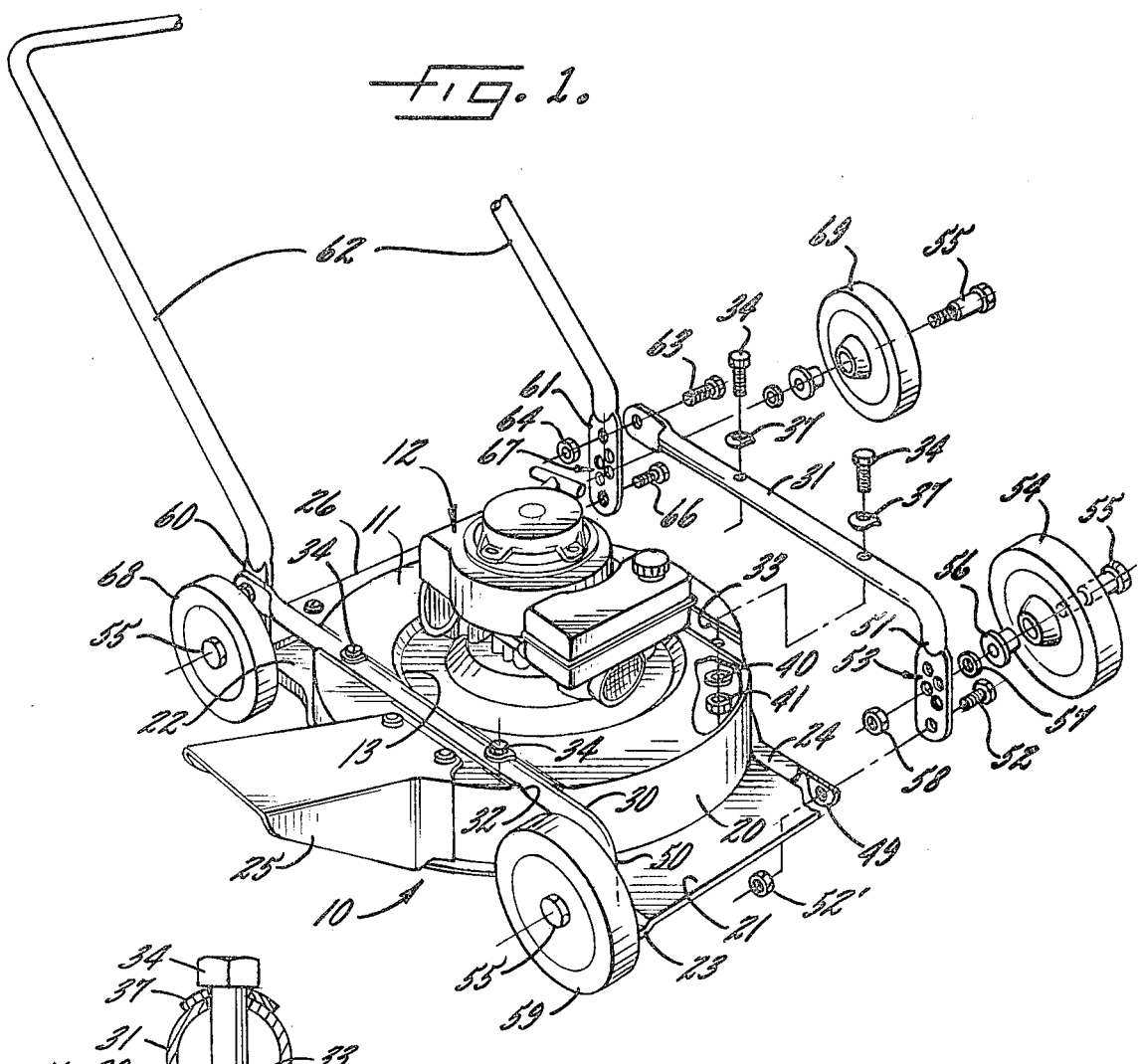
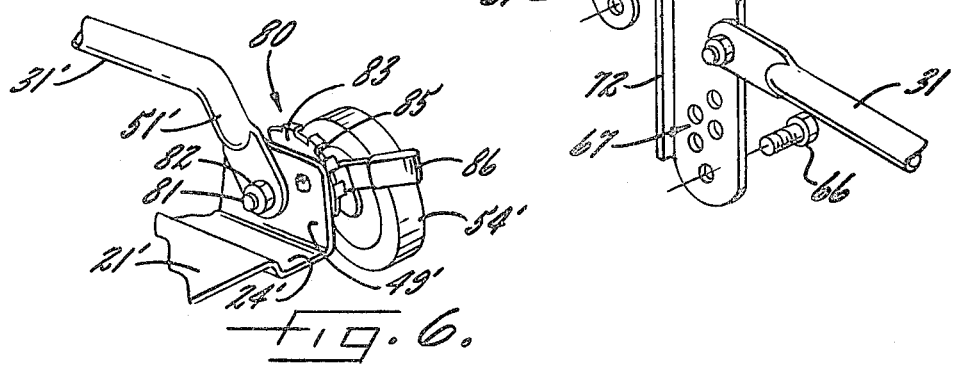

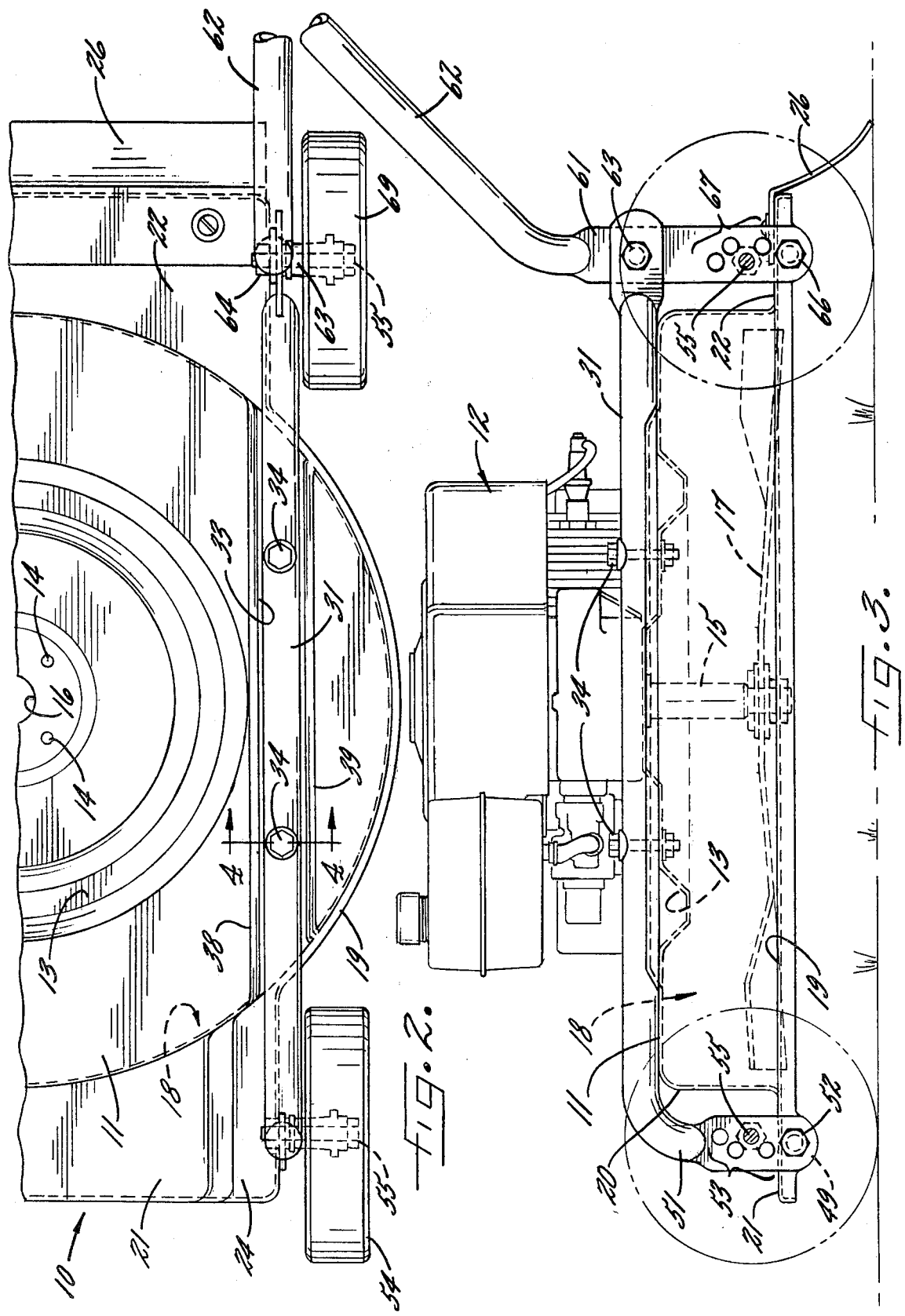

LAWNMOWER WITH LONGITUDINAL SUPPORT FRAME

This invention relates generally to push-type rotary lawnmowers having a flat cylindrical housing enclosing a rotary blade affixed to a shaft extending downward from a rotary power source mounted on the top of the housing. More particularly, the invention pertains to push-type rotary lawnmowers in which the wheels are attached to longitudinal frame members that extend bridgingly over the housing on opposite sides of the rotary power source with downward extensions that are attached to the wheels and with a tubular handle affixed thereto.

Push-type rotary lawnmowers typically have an inverted pan-shaped housing made of relatively heavy gauge metal or cast aluminum which has a cylindrical side wall for enclosing a horizontal rotary blade. Typically wheels are attached to the housing with brackets at four corner positions and the brackets are sometimes integrally formed with the housing to comprise a unitary mower deck so that the housing serves to transmit forces originating in the handle or wheels. Since for push-type lawnmowers the housing has served as a primary load bearing structure, the housing typically has been made of heavy gauge sheet metal or cast aluminum.

It is also known, for example as shown in Larson et al. U.S. Pat. No. 3,292,351, to employ longitudinal frame members bridging over the housing on opposite sides of the engine with forward and rear downward extensions in the frame members supported by the wheels at the four corner positions, however, the longitudinal frame members in such event have been pivotally attached to the top of the housing and free of any connection to the wall of the housing, with added linkage to secure adjustment of the height of the housing above the ground.

In addition to the practical user advantages of light weight, combined with durability, the present mower design has advantages. For example, the mower may be built large enough to have a 20 inch cut but still form a sufficiently light and compact package to be shipped by United Parcel Service. The mower design permits the use of steel as thin as 20 gauge for the mower housing, which saves six to seven pounds per deck, while still meeting all ANSI Safety Standards and the Mandatory Federal Standard.

The general aim of the invention is to provide a push-type rotary lawnmower having inherent high strength and rigidity for its weight, resulting from a cooperative combination of a sheet metal housing and longitudinal frame members, with the latter directly transmitting forces between the mower handle and the wheels thereby isolating the housing from these forces. This enables the thickness of the housing stock to be tailored to the light duty housing function rather than to the heavy duty wheel supporting function.

Yet another object of the invention is to provide an economical lawnmower design distinguished by low materials costs and simple and easy assembly to reduce labor costs. A related objective is to provide a rotary mower design which may be made as a modification of existing design, permitting the gauge of metal used for the mower housing to be minimized, with little or no retooling, and with addition of tubular frame members requiring only simple tooling, thereby reducing the cost of production facilities.

A further objective is to provide a design of push-type rotary lawnmower that has efficient annular air flow and which is free of baffles or other turbulence-producing irregularities to produce high speed discharge while being relatively immune from clogging, even when encountering thick vegetation.

Another object is to provide an inherently compact and light weight push-type rotary lawnmower that can be shipped by parcel post and which meets UPS size and weight limitations.

Furthermore an objective of the present invention is to provide a push-type rotary lawnmower design that is susceptible to construction in a number of different modes using both rigid and articulated handles, and providing either adjustable or fixed wheels.

In accordance with the present invention, a push-type rotary lawnmower is provided with a mower housing stamped from relatively thin gauge sheet metal of inverted pan shape with left and right longitudinal frame members bridging over and extending fore and aft of the housing, rigidly secured to the top of the housing on opposite sides of the engine. The longitudinal frame members further have downward extensions at their ends that are braced to the adjacent lower edge portions of the housing at four corner positions at which the wheels are also secured. The use of longitudinal frame members in combination with the mower deck and the attachment of the frame members at multiple points on the housing provides a structure that is more rigid and lighter than is possible with just tubular frame members or mower housing alone. An operator's handle extending upwardly and rearwardly from the mower deck is attached to the longitudinal frame members so that steering forces on the handle are transmitted to the wheels without significantly stressing the housing.

According to the preferred embodiment, the housing is braced by aprons extending horizontally fore and aft from the lower edge portion of the housing and having tabs that are bent vertically upward for attachment to the downward extensions of the longitudinal frame members at the four corner positions. The bracing means are integral with the mower housing so that the housing may be stamped from a single piece of sheet metal. The aprons also perform a bumper function to protect the front and rear portions of the cylindrical side wall of the housing from external impact during use of the mower.

In accordance with a more specific aspect of the invention, a plurality of incrementally stepped holes are provided in the frame members at each corner position with the riding height of the mower being determined by bolting the wheels to a selected set of holes. Alternatively the wheel height may be adjusted with a manually operated wheel height adjustment mechanism at each wheel.

In accordance with another aspect of the invention, the lower portions of the handle also function as the downward extensions at the rear ends of the longitudinal frame members. Alternatively, such downward extensions of the longitudinal frame member are comprised of brackets adapted for pivotal connection to the handle so that the handle may be easily raised or lowered for storage or use of the mower.

Other objects and advantages of the invention will become apparent upon reading the attached detailed description and upon reference to the drawings in which:

FIG. 1 is a perspective view of a mower constructed in accordance with the invention;

FIG. 2 is a plan view of the left side of the mower corresponding to the embodiment shown in FIG. 1 with the engine removed from the top of the housing;

FIG. 3 is a side elevation of the mower corresponding to the embodiment in FIG. 1;

FIG. 4 is a detailed sectional view along section line 4—4 in FIG. 2 showing the bolting of the longitudinal frame members to the top of the housing;

FIG. 5 is a fragmentary perspective view of an alternative embodiment of a rear downward extension of a horizontal frame member using a separate vertical bracket having a pivotal connection to an end of the handle; and FIG. 6 is a fragmentary perspective view of an alternative wheel height adjusting arrangement.

While the invention has been described in connection with certain preferred embodiments, it will be understood that I do not intend to be limited to the particular embodiments shown but intend, on the contrary, to cover the various alternative and equivalent constructions included with the spirit and scope of the appended claims.

Turning now to the drawings, FIG. 1 shows a push-type rotary lawnmower according to the invention having a mower deck generally designated 10 having an inverted pan-shaped housing 11 upon which a gasoline engine 12 is mounted. The top of the housing has a circular embossment 13 which serves to rigidify the top of the housing 11 for supporting the weight of the engine. The engine 12 is mounted to the top of the housing by four bolts (not shown) through holes 14 shown in FIG. 2. The engine 12 has a vertical shaft 15 extending downwardly through a clearance hole 16 (FIG. 2) in the top of the housing. A horizontal rotary blade 17 shown in FIG. 3 is secured to the bottom end of the rotary shaft 15. The housing 11 defines an unobstructed annular cavity generally designated 18 in FIG. 3 that receives the rotary blade 17 and is free of irregularities that would tend to impede air flow or cause the housing to become clogged with grass clippings.

The housing 11 has a lower edge portion 19 around the outer periphery of the vertical cylindrical wall 20 of the housing 11. This lower edge portion is horizontally bent for purposes of rigidification. Extending fore and aft of the lower edge portion 19 are generally horizontal aprons 21 and 22, respectively, which, in addition to performing a bracing function to be further discussed, serve to further protect the cylindrical walls 20 of the housing 11 against impact. The right and left sides of the front apron 21 have embossments 23 and 24 which further rigidify the edge of the apron. The housing 11 also has a grass clipping discharge spout 25 bolted to the housing. A rear safety guard 26 is bolted to the rear apron 22 to intercept stones or other debris rearwardly propelled by the blade 17.

According to the invention right and left longitudinal frame members 30 and 31 bridgingly extend over the top of the housing 11 on opposite sides of the engine 12. The top of the housing 11 has longitudinal embossments 32 and 33 for nestingly receiving the frame members 30,31 which are rigidly attached to the housing by four mounting bolts 34.

The method of attachment is shown in detail in FIG. 4. The bolt 34 first passes through a clamping washer 37 which helps to evenly distribute stress on the top of the longitudinal frame member 31 which has a tubular cross-section, for example, round, square or oval. The longitudinal frame member 31 nests in the embossment 33 which is formed as a valley between two raised ridges 38 and 39 in the top of the housing 11. A lock washer 40 and nut 41 screwed to the end of the bolt 34 completes the assembly.

The longitudinal frame members 30, 31 each have forward and downward extensions 50 and 51 respectively. These downward extensions are rigidly braced to the front apron 21 at downward extending tabs formed on the lateral edges of the apron, only the left front tab 49 being visible in FIG. 1. The end of the downward extension 51 is flattened and secured to the tab by a bolt 52 and nut 52'. The extension is provided with a series of holes generally designated at 53 in vertically stepped increments so that the left front wheel 54 may be bolted via a shoulder bolt 55 at a selected height. A bushing 56 provides reduced friction of the wheel 54 and a washer 57 and nut 58 complete the wheel attachment assembly. The right front wheel 59 is similarly attached to the forward downward extension 50 of the right longitudinal frame member 30.

The rear downward extensions of the longitudinal frame members 31, 32 are provided by right and left ends 60 and 61 respectively of a U-shaped tubular handle 62 extending rearwardly and upwardly from the mower deck 10. These handle ends 60, 61 are bolted to the longitudinal frame members; for example, the left frame member 31 is secured to the handle end 61 by a bolt 63 and nut 64. The lowermost tips of the handle ends 60,61 are bolted to downwardly extending vertical tabs similar to the left front tab 49 (FIG. 1) to rigidly brace the rear downward extension of the right and left longitudinal frame members 30,31 to the rear apron 22, for example, using the bolt 66 at the lower left rear corner of the mower deck. The downward extensions of the longitudinal frame members 30,31 comprising the handle ends 60,61 are provided with holes in vertically stepped increments such as the holes generally designated 67 in the handle end 61 for attachment of the rear wheels 68, 69 via shoulder bolts 55 in a manner similar to the method previously described for attaching the left front wheel 54 to the left front downward extension 51 of the left longitudinal frame member 31.

According to an alternative embodiment shown in FIG. 5 the rear downward extensions of the longitudinal frame members are provided by vertical brackets, such as the left bracket 70, that have pivotal connections such as pivot pin 71 received by the lower ends such as the left lower end 61' of the modified handle 62' for permitting up and down swinging of the handle. The vertical bracket 70 has a bent-over vertical edge 72 having an upper end 73 that limits the downward swinging motion of the handle.

An alternative embodiment of the invention having a manually selected wheel-height adjusting mechanism of known type, generally designated at 80, is shown in FIG. 6. Here the front apron 21', is provided with an upwardly bent vertical tab 49' that is bolted to the corresponding downward extension of the left longitudinal frame member 31' using a bolt 81 and nut 82. The latter also secure a mounting plate 83 having a set of arcuately arranged teeth 85 cooperating with an adjusting lever 86. Similar mechanisms 80 may be provided at all four wheels.

What I claim is:

1. A rotary lawn mower comprising, in combination, a mower deck including an inverted pan-shaped housing made of thin gauge metal having a horizontal top and a generally cylindrical side wall with a lower edge portion and defining a central space, a rotary power source mounted on the top of the housing and having a shaft extending into the central space, a blade mounted on the lower end of the shaft, the deck having pairs of front and rear corner positions, separately mounted left and right longitudinal frame members each having a central portion which extends bridgingly in horizontal position above the housing between respective front and rear corner positions, the frame members having downward extensions disposed adjacent said corner positions, wheels secured to the respective downward extensions, means for rigidly fastening the central portion of each frame member to the top of the mower housing, a handle extending rearwardly and upwardly from the mower deck for guiding the mower, and bracing means including rigid connections between each downward extension and the adjacent lower edge portion of the housing to minimize relative movement therebetween.

2. The combination as claimed in claim 1 in which the deck includes a front apron extending horizontally between the front corner positions and a rear apron extending horizontally between the rear corner positions, the aprons being integral with the adjacent lower edge portion of the housing, the aprons having lateral edge portions extending fore-and-aft, the downward extensions of the frame members being disposed in adjacent relation to the lateral edge portion of the aprons and secured thereto so as to be braced against relative movement in both the lateral and longitudinal directions.

3. The combination as claimed in claim 1 in which the deck includes a front apron extending horizontally between the front corner positions and a rear apron extending horizontally between the rear corner positions, the generally cylindrical side wall being of substantially constant height so that the lower edge thereof lies substantially in a plane, the aprons being formed integrally by bending the metal at the lower edge of the side wall at right angles resulting in a central space in the form of a symmetrical and unobstructed annulus free of baffles or other interruptions so that upon rotation of the blade the air in the central space is guided for free flow at high velocity in an annular path.

4. The combination as claimed in claim 1 in which the frame members are formed of respective hollow metal tubes, the tubes being bent downwardly to form the downward extensions at at least the front corner positions.

5. The combination as claimed in claim 4 in which the horizontal top of the housing is embossed to form shallow grooves for nestingly receiving the tubular frame members, the embossments being spaced to straddle the power source thereby serving to rigidify the top of the housing.

6. The combination as claimed in claim 2 in which each apron has, along its lateral edges, integral vertically bent tabs with means for securing thereto the respective downward extensions of the frame members.

7. The combination as claimed in claim 6 in which at least the front apron is formed, adjacent the bent tabs, with respective longitudinal embossments for rigidification of the region of attachment of the tabs.

8. The combination as claimed in claim 1 in which the handle is connected, at its lower end, directly to the longitudinal frame members so that forces developed in the handle incident to guiding the mower are transferred directly to the frame members and thence directly to the wheels thereby bypassing the housing so that the housing is not stressed upon manipulation of the handle.

9. The combination as claimed in claim 1 in which the handle is of inverted "U" shape and in which the lower ends of the handle form the downward extensions of the frame members in the rear corner positions.

10. The combination as claimed in claim 1 in which each frame member is of "L" shape, being bent downwardly at its forward end to provide a downward extension, the downward extension at the rear end of each frame member being in the form of a vertically arranged bracket having means at its upper portion for pivotal connection of the handle for rocking about a transversely extending axis.

11. The combination as claimed in claim 1 in which each wheel has an axial supporting bolt for securing the same to the respective downward extensions and in which each downward extension has a series of openings in vertically stepped increments for accepting the bolt thereby to determine the riding height of the mower deck above the ground.

* * * * *